(12) United States Patent
Lauber

(10) Patent No.: US 7,967,174 B2
(45) Date of Patent: Jun. 28, 2011

(54) ARTICLE CARRIER FOR AN INVALID VEHICLE

(76) Inventor: Rene Lauber, Cornwall (CA)

( * ) Notice: Subject to any disclaimer, the term of this patent is extended or adjusted under 35 U.S.C. 154(b) by 0 days.

(21) Appl. No.: 12/589,007

(22) Filed: Oct. 15, 2009

(65) Prior Publication Data

US 2010/0096423 A1 Apr. 22, 2010

Related U.S. Application Data

(60) Provisional application No. 61/196,667, filed on Oct. 20, 2008.

(51) Int. Cl.
*B60R 7/00* (2006.01)
(52) U.S. Cl. .................. 224/407; 280/304.1; 280/304.5
(58) Field of Classification Search .................. 224/407, 224/282, 275; 297/188.2; 280/304.1, 304.5, 280/250.1; 248/127, 129; 180/907
See application file for complete search history.

(56) References Cited

U.S. PATENT DOCUMENTS

| | | | | |
|---|---|---|---|---|
| 4,346,912 A * | 8/1982 | Habib | ........................ | 280/644 |
| 4,577,903 A * | 3/1986 | Wells | ...................... | 297/188.06 |
| 4,789,175 A * | 12/1988 | Schramm | ................... | 280/304.1 |
| 4,861,059 A * | 8/1989 | Shirk | ........................ | 280/304.1 |
| 5,020,624 A | 6/1991 | Nesterick | | |
| 5,180,181 A | 1/1993 | Letechipia | | |
| 5,374,074 A * | 12/1994 | Smith | ........................ | 280/304.1 |
| 5,409,154 A * | 4/1995 | Blount | ........................ | 224/274 |
| 6,089,593 A | 7/2000 | Hanson | | |
| 6,105,839 A * | 8/2000 | Bell | ............................. | 224/275 |
| 6,231,016 B1 * | 5/2001 | Slone | ........................ | 248/200.1 |
| 6,401,996 B1 * | 6/2002 | Thom et al. | ................... | 224/407 |
| 6,857,649 B2 * | 2/2005 | Patton | ........................ | 280/250.1 |
| 7,188,855 B1 * | 3/2007 | Thomas | ..................... | 280/304.1 |
| 7,301,757 B2 * | 11/2007 | Lee et al. | ................. | 361/679.27 |
| 7,665,642 B2 * | 2/2010 | Abbate | ........................ | 224/585 |
| 2001/0011664 A1 * | 8/2001 | Meritt | ........................ | 224/275 |
| 2004/0262345 A1 * | 12/2004 | Polburn et al. | ................ | 224/275 |
| 2005/0072824 A1 * | 4/2005 | Lee et al. | ...................... | 224/585 |
| 2006/0169730 A1 * | 8/2006 | Morrison | ...................... | 224/275 |
| 2007/0131730 A1 * | 6/2007 | Mirzale | ........................ | 224/407 |
| 2009/0152826 A1 * | 6/2009 | Silva et al. | ................. | 280/47.34 |

* cited by examiner

*Primary Examiner* — Paul N Dickson
*Assistant Examiner* — Maurice Williams

(57) ABSTRACT

A carrier for carrying goods for an invalid vehicle, such as a wheelchair, having a seat. The carrier has a basket support and a foldable basket with a back wall. The basket support has vehicle connectors for detachably connecting the basket support to the vehicle with the support behind the seat. The basket support also has basket connectors for detachably connecting the basket to the support with its back wall against the support. The basket can be detached from the basket support and used alone. The support, with or without the basket attached to it, can be detached from the wheelchair when the wheelchair is to be folded.

4 Claims, 8 Drawing Sheets

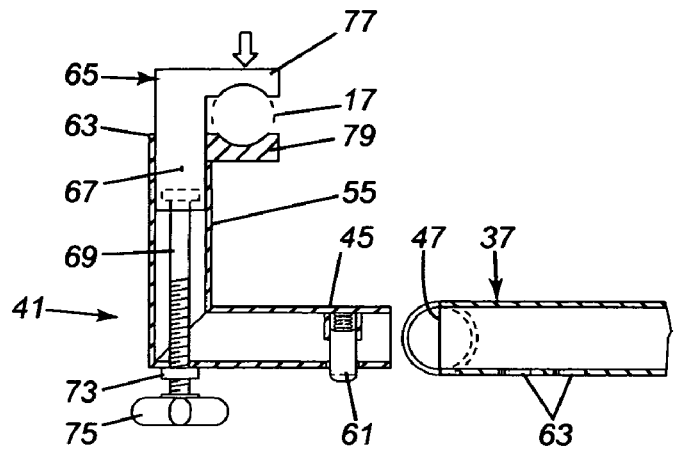
FIG. 6
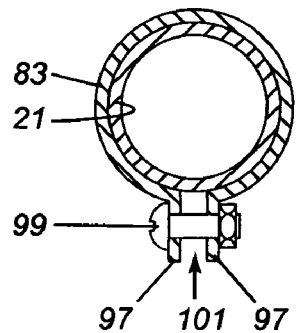
FIG. 7
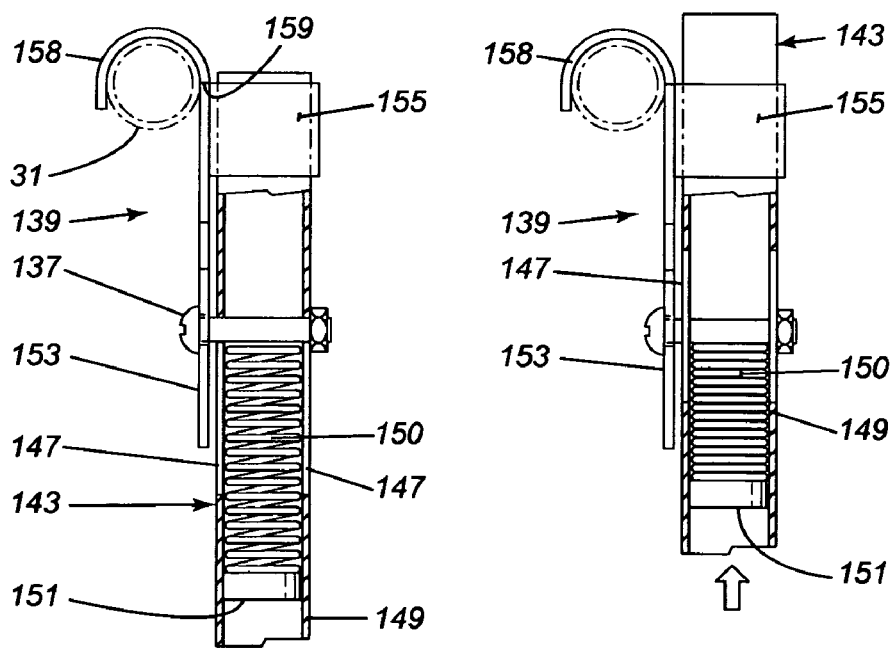
FIG. 8A  FIG. 8B

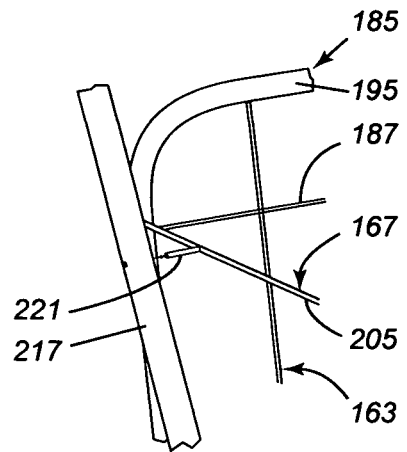
FIG. 11
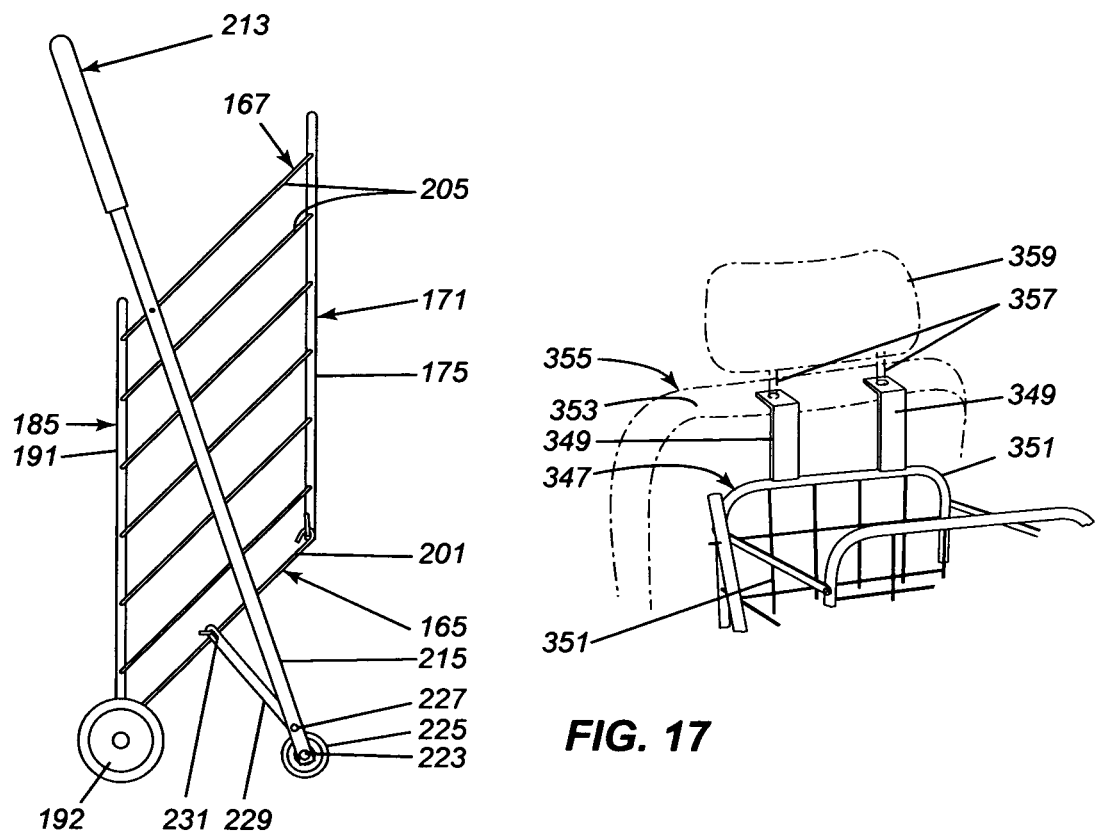
FIG. 12
FIG. 17

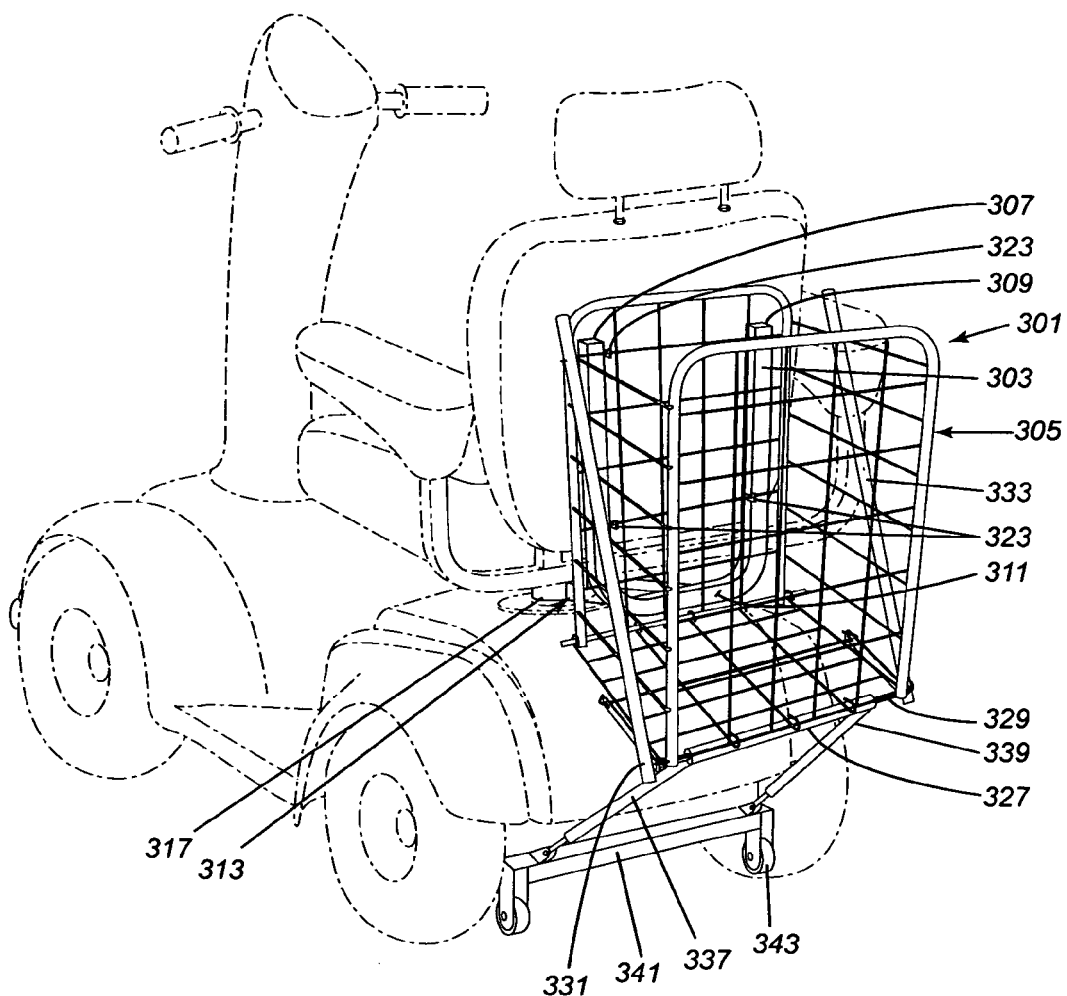
FIG. 14
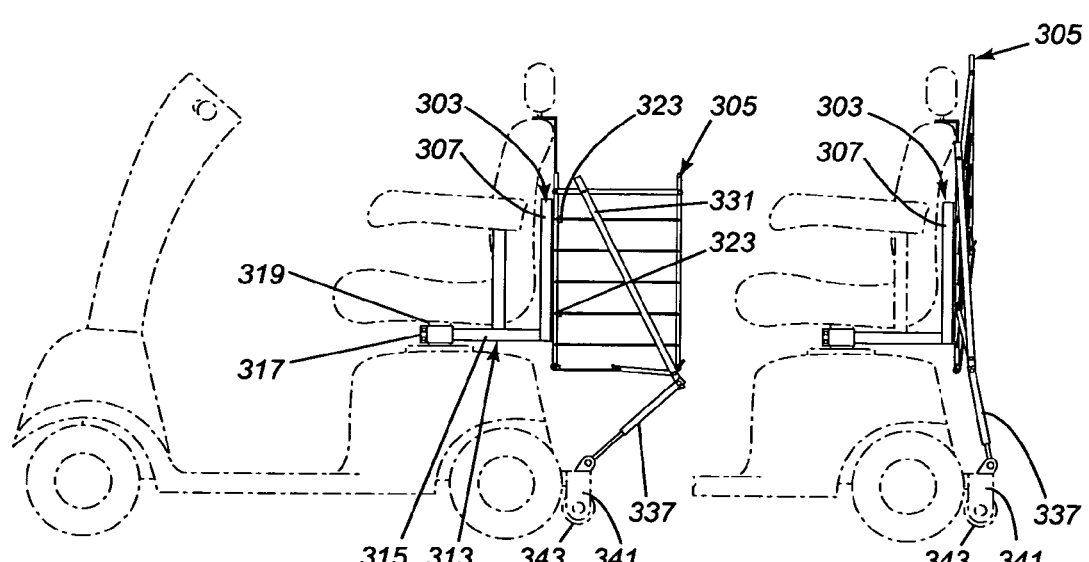
FIG. 15  FIG. 16

ARTICLE CARRIER FOR AN INVALID VEHICLE

BACKGROUND OF THE INVENTION

1. Technical Field

This invention relates to an article carrier for an invalid vehicle. The invention is particularly directed toward an article carrier for use with a wheelchair.

2. Background Art

Invalid vehicles, such as wheelchairs, do not normally have means for transporting goods. If they do have such means, they usually have a small capacity since they must be attached to one side or the other of the wheelchair to permit folding of the wheelchair when the wheelchair is to be transported.

SUMMARY OF THE INVENTION

It is the purpose of the present invention to provide a carrier for carrying a relatively large quantity of goods which can be detachably mounted onto the back of an invalid vehicle. The carrier of the present invention comprises a basket support and a foldable basket. The basket support can be detachably connected to the back of an invalid vehicle and easily removed when the wheelchair has to be folded. The basket can be detachably connected to the basket support. The basket can be folded for storage when not being used while connected to the basket support on the wheelchair. The basket can be removed from the support and used on its own if desired.

The basket support has top and bottom vehicle connecting means for detachably connecting the support to the wheelchair. The top and bottom vehicle connecting means are adjustable in width to fit the width of the wheelchair. The basket support also has basket connecting means for detachably connecting the basket to it. The basket connecting means preferably also has top and bottom connecting means. The bottom connecting means preferably employs a shelf that is pivotally connected to the support to move between a level position for receiving and carrying the basket and a raised, stored position.

The invention is particularly directed toward a carrier for an invalid vehicle having a seat, the carrier comprising a basket support and a foldable basket. The foldable basket has a front wall and a back wall both pivotally connected to a bottom wall, and side walls each pivotally connected between the front and back walls. The basket support has vehicle connecting means for detachably connecting the basket support to the back of the vehicle behind the seat. The basket support also has basket connecting means for detachably connecting the basket to the back of the support with its back wall against the support.

DESCRIPTION OF THE SEVERAL VIEWS OF THE DRAWINGS

FIG. 6 is a cross-sectional detail view of an upper vehicle connecting means on the support;

FIG. 7 is a cross-sectional detail view, taken along line 7-7 in FIG. 2 of a lower vehicle connecting means on the support;

FIG. 8A is a cross-sectional view of the lower basket connecting means taken line 8-8 in FIG. 3;

FIG. 8B is a view similar to FIG. 8A showing an arm of the shelf moved relative to the bracket;

FIG. 11 is a detail view of the basket;

FIG. 12 is a side view of the basket being partially folded;

FIG. 14 is perspective view of the carrier mounted on a motorized invalid chair;

FIG. 15 is a side view of the chair with the carrier;

FIG. 16 is a partial side view with the basket folded up on the chair; and

FIG. 17 is a detail view of a modification of the basket used in the chair.

DETAILED DESCRIPTION OF THE INVENTION

Figure 1:
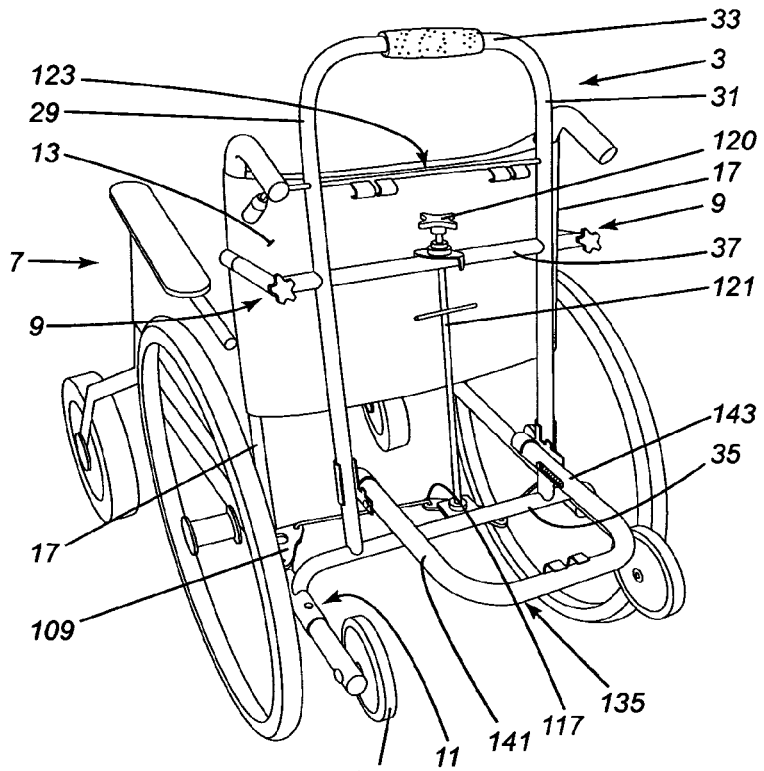
FIG. 1 is a perspective rear view of a wheelchair with a basket support mounted on the wheelchair.
Figure 2:
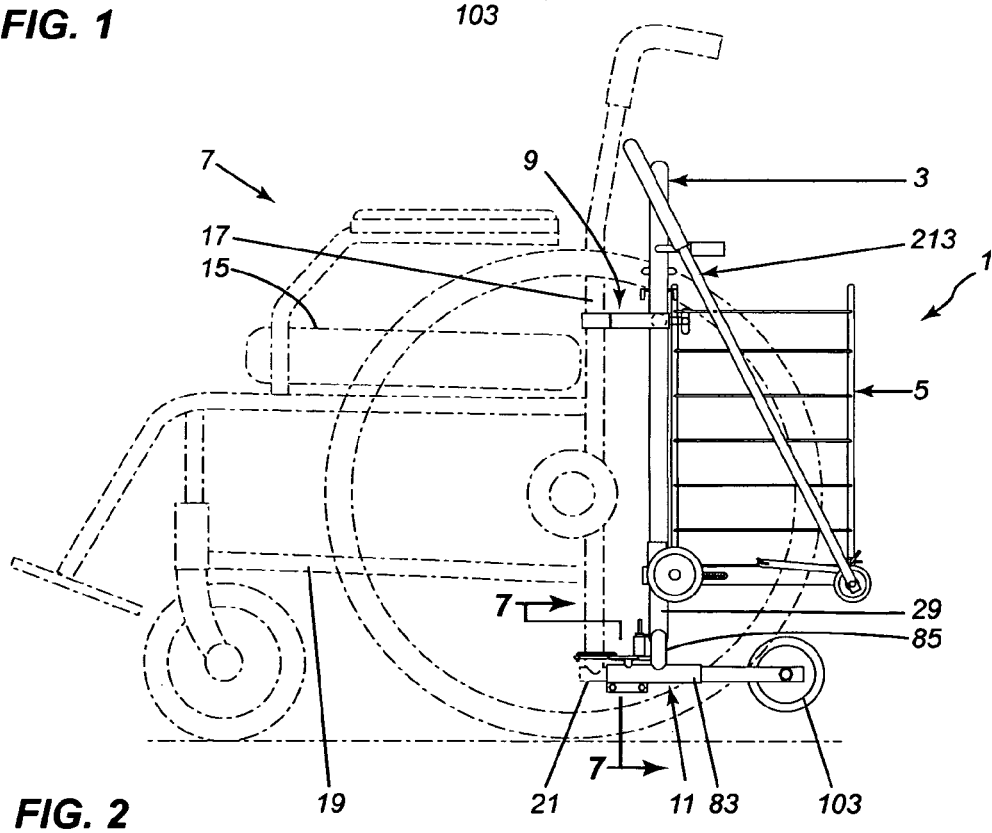
FIG. 2 is a side view of the wheelchair with a basket mounted on the basket support.

The carrier 1, as shown in FIGS. 1 and 2 comprises a basket support 3 and a foldable basket 5. The carrier 1 is detachably mountable on the back of an invalid vehicle, specifically a wheelchair 7, via the basket support 3. The basket support 3 has upper and lower vehicle connecting means 9, 11 for detachably connecting the support 3 to the wheelchair so that the support is adjacent the back rest 13 of the seat 15 of the wheelchair. The upper, vehicle connecting means 9 detachably connect to the rear, armrest posts 17 forming part of the frame 19 of the wheelchair 7. The lower, vehicle connecting means 11 detachably connect to the rear, safety wheel supports 21 on the bottom of the armrest posts 17. The wheel supports 21 are horizontal tubes that extend rearwardly from the bottom of the armrest posts 17 and can receive small safety wheels (not shown) that extend rearwardly and prevent the wheelchair from tipping backward.

Figure 3:
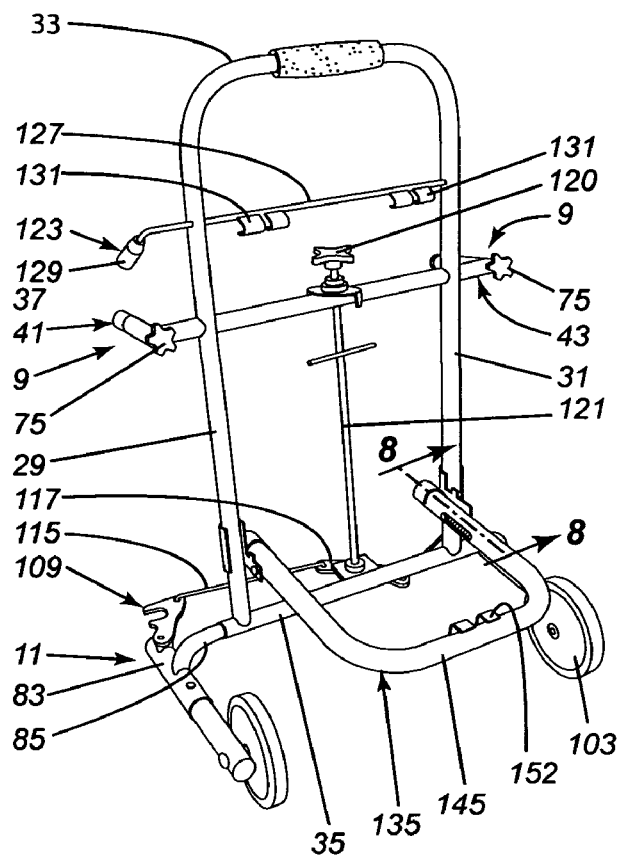
FIG. 3 is a perspective view of the basket support.
Figure 4:
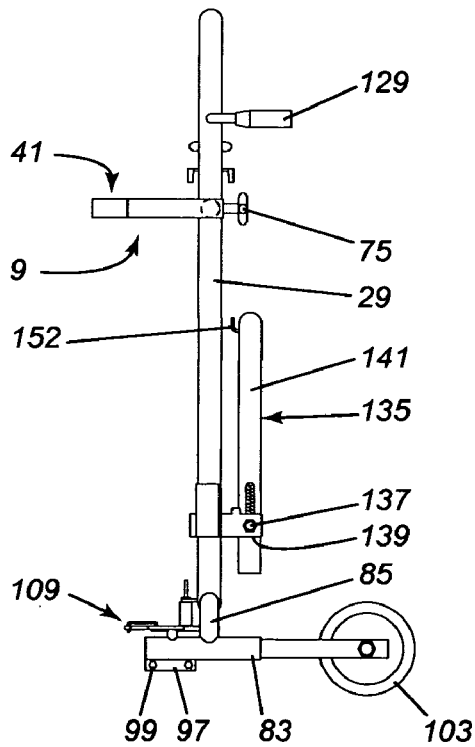
FIG. 4 is a side view of the basket support.
Figure 5:
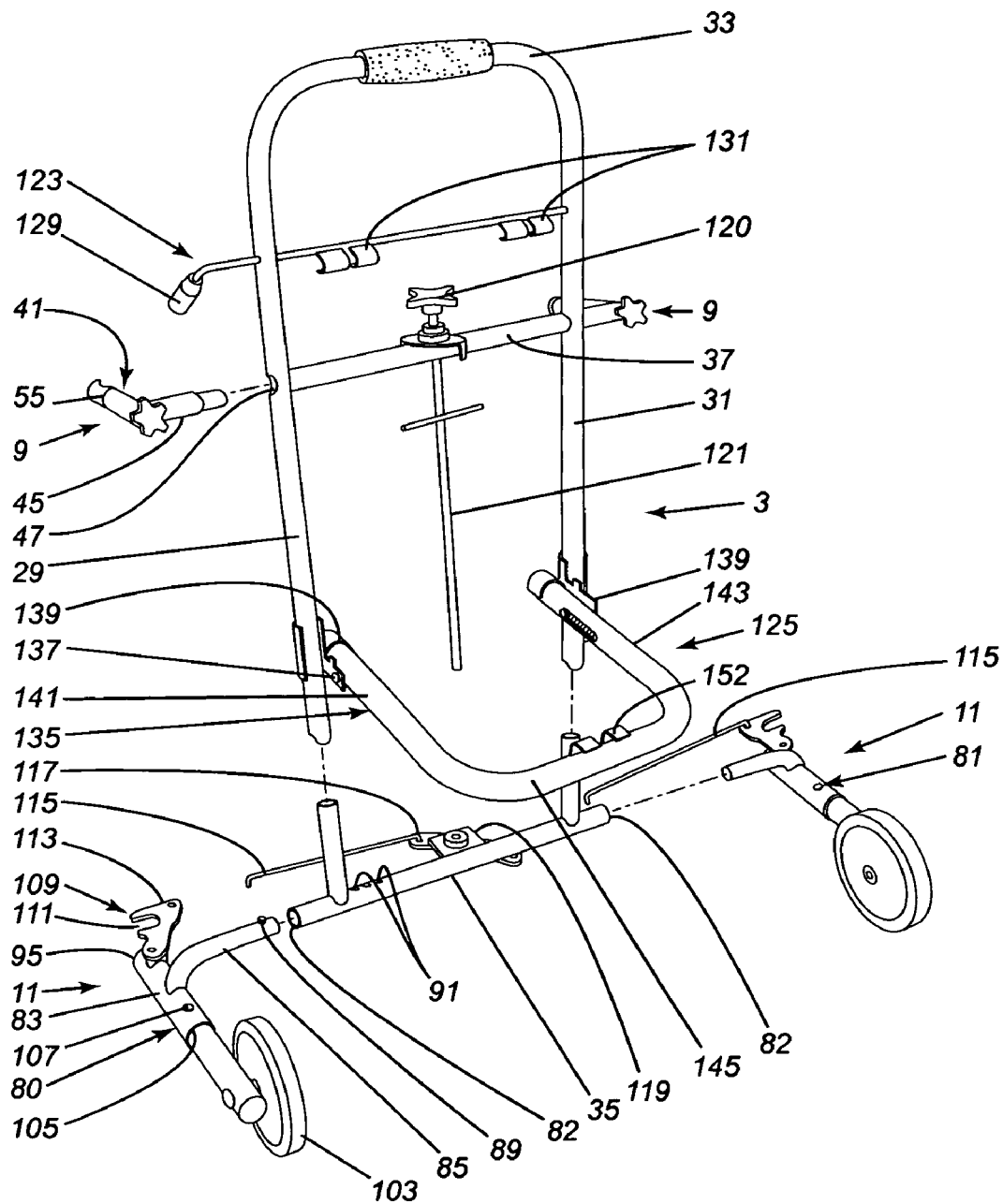
FIG. 5 is a an exploded, perspective view of the basket support.

The basket support 3, as shown in FIGS. 3, 4 and 5, is a frame member having a generally rectangular shape with two spaced vertical posts 29, 31 joined by a top horizontal member 33, forming a handle, and a bottom horizontal member 35. An intermediate horizontal cross-member 37 is provided to strengthen the frame, and to carry the upper, vehicle connecting means 9 for mounting the support 3 to the arm rest posts 17 of the wheelchair 7. The bottom horizontal member 35 carries the lower, vehicle connecting means 11 for mounting the support 3 to the safety wheel supports 21.

The intermediate cross-member 37 is a hollow tube and the upper vehicle connecting means 9 can comprise a pair of right angled arms 41, 43. The arms 41, 43 are the same except for one being left and the other right so only one arm will be described in detail. The arm 41, as shown in FIG. 6, is slidably inserted by one leg 45 into one open end 47 of the intermediate cross-member 37. The other leg 55 of arm 41 extends rearwardly from the leg 45. The leg 45 has a spring biased pin 61 near its free end projecting slightly transversely from the leg. The pin 61 enters one of several spaced-apart holes 63 in the wall of the tube member 37 to lock the arm 41 in the desired position to fit the width of the posts 17 on the wheelchair that the support 3 is being mounted on. This type of locking means is well known.

The other leg 55 of arm 41 carries a slidable gripping member 65 to receive a post 17 on the wheel chair 7. The movable gripping member 65 has an inner cylindrical portion 67 for insertion into the open end 63 of the other leg 55. A threaded stem 69 extends from the inner end of the portion 67 and out through the wall of the one leg 45. The end of the stem 69 is threaded through a collar 73 on the wall of the leg 45 and a turn knob 75 is fixedly mounted on the end of the stem 69. Turning the knob 75 in one direction will draw the free end 77 of the gripping member 65 toward a fixed gripping member 79 on the leg 55 to clamp the post 17 between them.

The lower vehicle connecting means 11, shown in FIGS. 3 and 5 comprises a pair of tubular members 80, 81 insertable into the open ends 82 of the bottom cross-member 35, the cross-member extending just past the posts 29, 31. The members 80, 81 are the same except for being left and the other right, so only one will described in detail. The member 80 has a short horizontal tube section 83 with a vertical tube section 85 extending upwardly from, and then horizontally transverse to, the section 83. The tube section 85 is inserted into the open end 82 of the bottom cross-member 35 on the support 3. The tube section 85 carries a spring loaded pin 89 that extends into one of several holes 91 on the wall of the cross member 35 to lock the member 80 in the desired position to fit the width of the wheelchair posts 17.

The horizontal tube section 83 of the member 80 has a split end 95 for fitting over the rear end of the wheel support 21 at the bottom of the post 17 on the wheelchair. The split end 95, as shown in FIG. 7, has abutting flanges 97 which can be drawn together with bolts 99 to close the split 101 to lock the section 83 on the wheel support 21. The safety wheel 103 for the wheelchair, that normally was mounted on the wheel support 21, is detachably mounted in the other open end 105 of the tube section 83 with a spring loaded pin 107.

A locking member 109, forming part of the lower vehicle connecting means, is pivotally mounted on the top of the tube section 83 adjacent its split end 95, the locking member 109 having a slot 111 at its free end 113 for receiving the post 17. The locking members 109 from both sides of the support 3 are joined by rods 115 to the ends of a crank arm 117 rotatably mounted to a plate 119 fixed to the back of the cross-member 35 at its center. An actuating handle 120 on the middle of the intermediate cross member 37 is connected via a post 121 to the crank arm 117 to rotate it either direction thus locking or unlocking the locking members 109 to the posts 17 via the rods 115. The lower vehicle connecting means 11 holds the bottom of the support 3 to the posts 17 on the wheelchair and transfers the weight of the load in the basket 5, resting on the support 3, to the bottom of the posts 17 via the wheel support 21 on the posts. The locking members 109 would be used for a wheelchair with the most common width since the rods are not adjustable. Alternatively, the carrier can be provided with sets of rods of different standard length to have the carrier fit wheelchairs of different width.

The basket support 3 carries upper and lower basket connecting means 123, 125 to detachably connect the basket to the support. The upper, basket connecting means 123, as shown in FIG. 3, comprises a shaft 127 rotatably mounted between the vertical posts 29, 31 of the support 3 just above the intermediate cross-member 37 on the support. The shaft 127 has a handle 129 at one end and a pair of spaced-apart c-shaped clips 131 fixed to it, the clips 131 opening toward the back of the support 3. The clips 131 are rotated clockwise, looking at FIG. 3, by rotating the shaft 127 with the handle 129, to have the clips 131 grasp and hold the back wall of the basket 3 as will be described.

The lower basket connecting means 125, as shown in FIGS. 3 and 5, comprises a shelf 135 pivotally attached by pivot pins 137 at its ends to brackets 139. The brackets 139 are fixedly mounted to the lower ends of the posts 29, 31 just above the bottom cross-member 35. The shelf 135 is a tubular member bent in a u-shape having two arms 141, 143 joined by a cross arm 145. The shelf 135 is mounted to move relative to the pivot pins 137 holding it to the brackets 139. The pivot pins 137 are mounted through short longitudinal slots 147 in the side walls 149 of the arms 141, 143 as shown in FIG. 8A. Tension springs 150 are mounted between the walls 151 in the arms 141, 143 spaced from the slots 147 and the pivot pins 137 allowing the shelf 135 to be pushed rearwardly against the springs 150 as shown in FIG. 8B. The shelf has a clip 152 mounted on the top of the cross arm 145 of the shelf. The clip 152 opens forwardly away from the arms 141, 143 and helps mount the basket as will be described.

Figure 9:
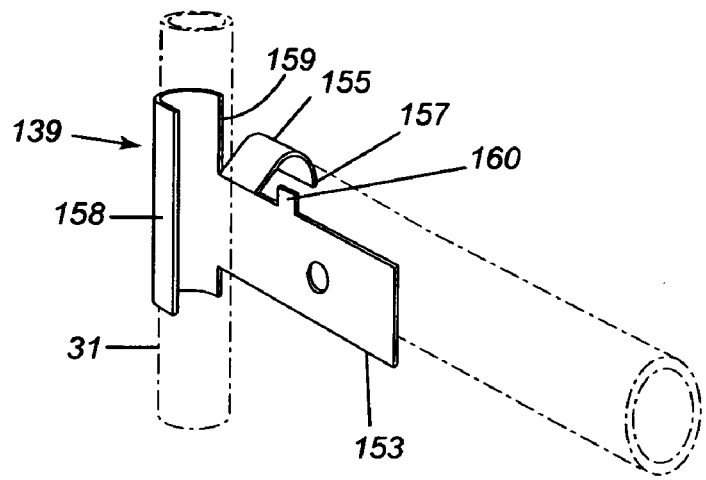
FIG. 9 is a perspective view of a bracket forming part of the lower basket connecting means.

The bracket 139, as shown in FIG. 9, has a straight body portion 153 which is located alongside the outer side of the legs 141, 143 of the shelf 135 in a vertical position as shown in FIG. 8A. A curved top portion 155 extends laterally from the end of the body portion 153 with its outer end 157 curved downwardly. The bracket has semi-cylindrical mounting portion 158 extending vertically and opening toward the body portion 153, the cylindrical portion attached along one edge 159 to the rear end of the body portion 153. The brackets 139 are securely attached to the posts 29, 31, through the semi-cylindrical portion 158 partly wrapped about the posts, by suitable fastening means. The legs 141, 143 of the shelf 135 are attached to the body portion 153 of the brackets by the pivot pins 137, the legs located under the top portion 155 of the bracket. The top portion 155 retains the shelf in a generally horizontal position to support the weight of the basket and to carry its load. The brackets 139 also have a tab 160 in the body portion 153 just in front of the posts 29, 31 to help retain the bottom rear of the basket as will be described.

Figure 10:
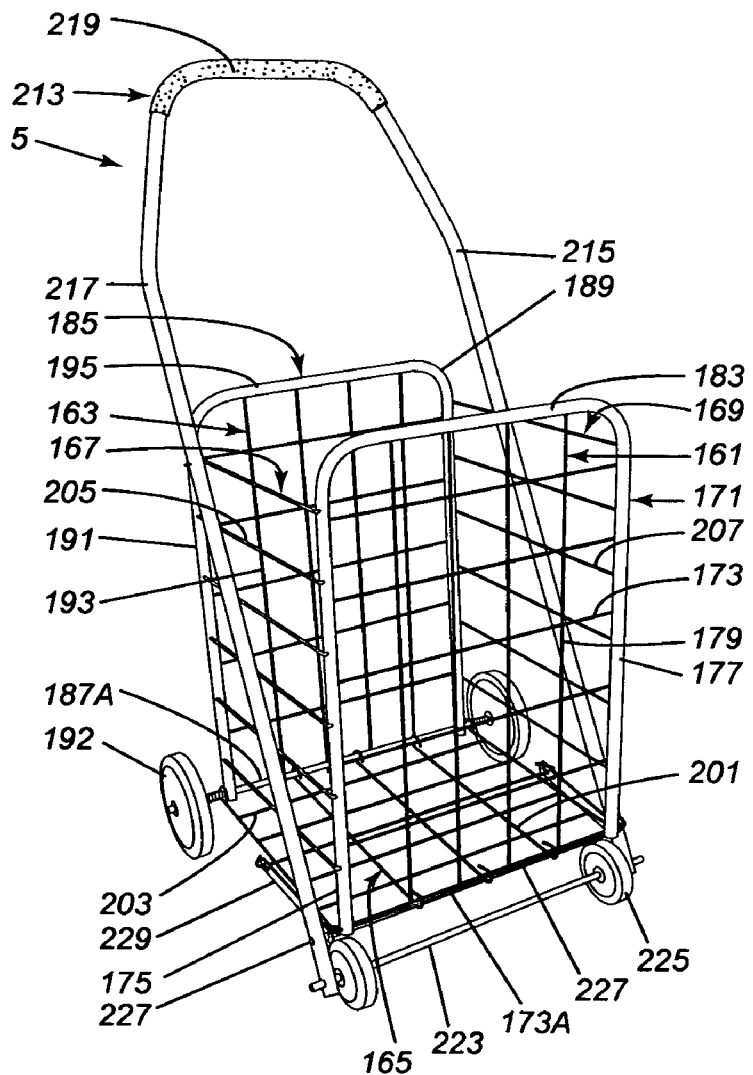
FIG. 10 is a perspective view of the folding basket.
Figure 13:
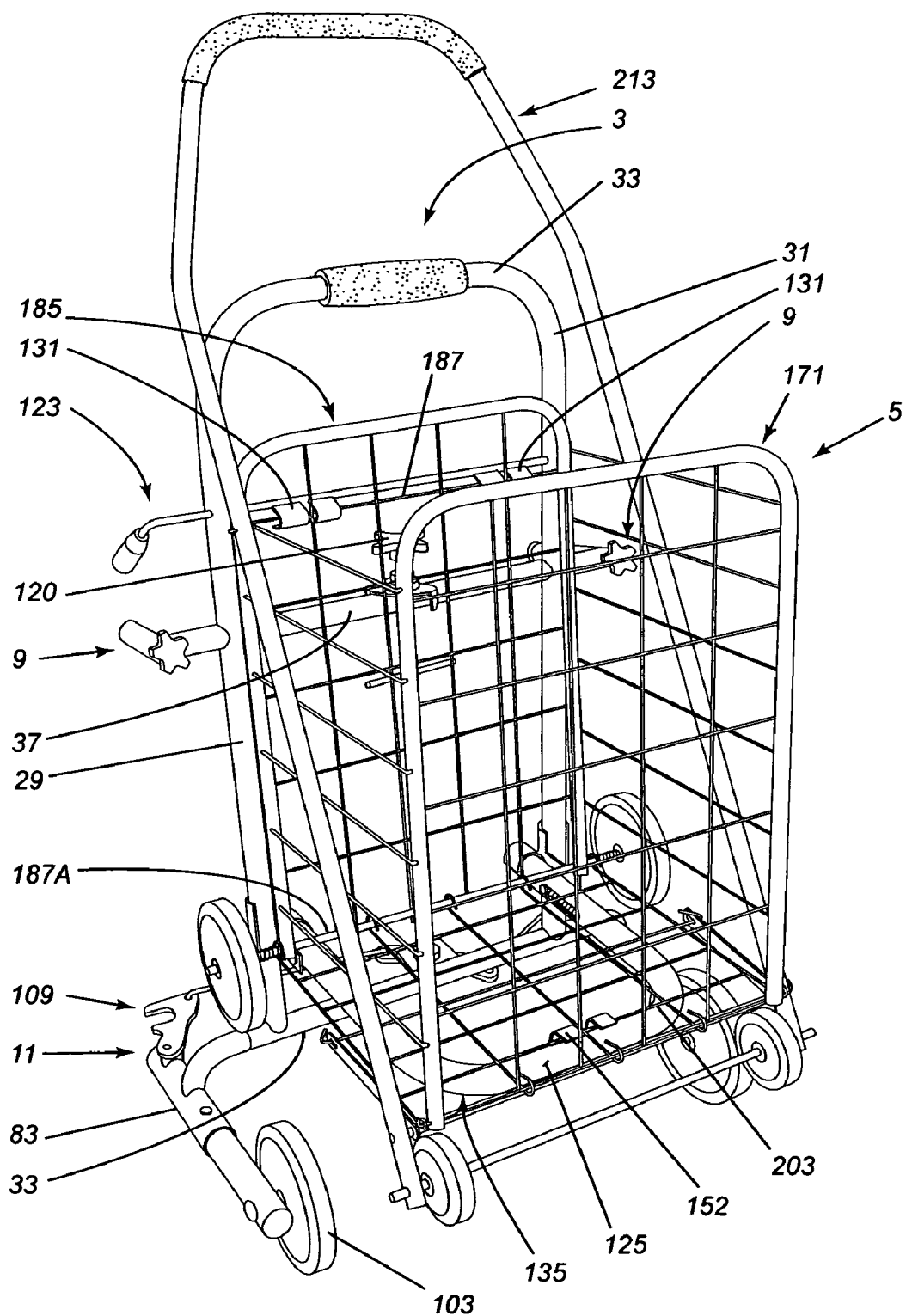
FIG. 13 is a perspective view of the basket mounted on the basket support.

The foldable basket 5 is detachably connected to the base 3. The basket 5, shown in the unfolded position in FIG. 10, is made of wire and has a front wall 161 and a parallel back wall 163 joined by a bottom wall 165. Parallel side walls 167, 169 join the front and back walls 161, 163. The front and back walls 161, 163 are pivotally joined to the bottom wall 165 and the side walls 167, 169 are each pivotally joined between the front and back walls 161, 163.

The front, back and bottom walls 161, 163, 165 are made from transversely crossed, spaced-apart wires. The front wall 161 has an inverted u-shaped front frame 171 with horizontal wires 173 extending between, and fixedly attached to, the vertical legs 175, 177 of the frame 171. The front wall 161 also has vertical wires 179 extending between the horizontal leg 183 of the frame 171 and the bottom horizontal wire 173A. The back wall 163 similarly has an inverted u-shaped rear frame 185 with horizontal wires 187 extending between, and fixedly attached to, the vertical legs 189, 191 of the frame 185. The bottom horizontal member 187A is a shaft rather than a wire and mounts the rear wheels 192 of the basket adjacent the legs 189, 191 of the frame 185. The back wall 163 also has vertical wires 193 extending between the horizontal leg 195 of the frame 185 and the bottom shaft 187A. The bottom wall 165 has spaced apart longitudinal wires 201 extending between the bottom wire 173A and the shaft 187A of the front and back walls, respectively, and are pivotally attached to them. Transverse wires 203 extend across the longitudinal wires 201 and are attached to them.

The side walls 167, 169 are each made from horizontal wires 205, 207, respectively, vertically spaced apart. The horizontal wires 205 in side wall 167 are pivotally attached at their ends to the front and back vertical legs 175, 191 of the front and rear frames 171, 185 respectively. The wires 207 in the side wall 169 are pivotally attached at their ends to the other front and back vertical legs 177, 189 of the front and rear frames 171, 185.

The basket 5 has a u-shaped stabilizing frame 213 comprising two arms 215, 217 joined by a top cross-member 219.

The cross-member 219 is located well above the basket and forms a handle for manipulating the basket. The arms 215, 217 are pivotably attached by pivots 221, as shown in FIG. 11 to the top of the side walls 167, 169 near the back wall 163 and extend down and forwardly toward the front wall 161 and below the bottom wall 165 to a cross-member 223 spaced just below the bottom wall 165 and parallel to it. The cross-member 223 forms an axle for the front wheels 225 of the basket, the wheels mounted on the axle adjacent the arms 215, 217.

A second cross-member 227, spaced above the first cross member 223, and joined to the arms 215, 217, supports the bottom wall 165 in the unfolded position of the basket. The cross-member 227 is adjacent the bottom wire 173A of the front wall 161. A pair of links 229 extend along the sides of the bottom wall 165, each link pivotally joined at its front end to the second cross-member 227 between the basket and an arm 215, 217. Each link 229 is also pivotally joined at its rear end by a pivot 231 to the bottom wall 165 about midway between the front and back walls 161, 163 of the basket. The pivot 231 is preferably formed by extending one of the cross wires 203 in the bottom wall 165.

The stabilizing frame 213 prevents lateral movement of the basket's walls while supporting the bottom wall 165 of the basket in its lowered, generally horizontal position when the basket is opened as shown in FIG. 10. The links 229 draw the stabilizing frame 213 and front wheels 225 in toward the back wall 163 as the basket is folded up as shown in FIG. 12.

In use, the carrier 1 is mounted onto the back of a wheelchair 7 as shown in FIG. 2 with the basket support 3 being mounted first as shown in FIG. 1. The upper, vehicle connecting means 9 on each side of the support 3 are first adjusted as to the distance between the wheelchair arm rest posts 17, and then clamped onto the upper portion of the arm rest posts 17 using the movable and fixed gripping members 65, 79. The lower, vehicle connecting means 11 are also connected to the back of the wheelchair by first being adjusted as to the distance between the wheelchair arm rest posts 17. The safety wheel 103 on the safety wheel supports 21 of the wheelchair, if such wheels are being used, are removed and then the safety wheel supports 21 on the wheelchair are inserted into the horizontal tubular sections 83 of the lower vehicle connecting means. The split end of the sections 83 are opened to allow insertion of the supports 21, and the split end is then tightened over the supports 21, using the bolts 99 to secure the bottom of the support 3 to the wheelchair frame. In addition, the lock members 109, forming part of the lower vehicle connecting means 11, are moved by the crank arm 117, through handle 120, onto the posts 17 to help retain the support 3 on the wheelchair. The safety wheels 103 can now be mounted in the rear end of the horizontal tubular section 83 as shown in FIG. 1.

Once the basket support 3 is connected onto the wheelchair, as shown in FIG. 1, the basket 5 is connected to the basket support 3 by the top and bottom connecting means 123, 125 on the base 3. The connection of the basket to the basket support is shown in FIG. 12. The basket 3 is unfolded and placed with its bottom wall 165 on the shelf 135 and its back wall 163 against the back of the base 3. The bottom wall 165 is connected to the back of the shelf by placing the shaft 187A at the bottom, back of the basket behind the tabs 160 in the brackets 139. A wire 203 near the front of the basket in the bottom wall 165 is then hooked under the front of the clip 152 on the front, top of the shelf. The shelf 135 may have to be moved rearwardly to mount the wire under the clip. The top connecting means 123 is then actuated to hook the clips 131 over and about a wire 187 on the back wall of the basket to hold the back of the basket down in the notches 164. The weight of the basket, when loaded, rests on the shelf which transmits the load via the brackets 139 to the posts 29, 31 and then through the bottom vehicle connectors 11 to the wheel support 21 on the frame of the wheelchair.

When the basket 5 is empty it can folded out of the way up against the back of the support 3, the shelf 135 folding up with the bottom of the basket and moving toward the back, if needed, to accommodate the movement of the basket to its new position. A clip (not shown) on the front wall would hold the front wall to the back wall in the folded position. The basket 5 can also be quickly removed from the support 3 and used on its own if needed. The support 3 can also be quickly and easily removed if the wheelchair needs to be folded.

Specific vehicle connecting means have been shown. However it is contemplated that other forms of upper and lower lower connecting means can be employed. For example, the upper support connecting means could comprise a simple, split, hinged ring mounted on the end of the leg 55 of the arms 41. One half of the split ring would be mounted on the end of the leg 55, the other half hinged at one side to one side of the one half. The other sides of the two halves would be detachably connected together with a simple clasp.

Specific basket connecting means have been shown. Other forms could be used that still permit folding of the basket when not in use. For example, the shelf could be omitted, and a pair of gas cylinders could be permanently connected to the bottom cross-member 35 of the support 3 and detachably connected to a sleeve mounted over the axle of the front wheels. The supports would be designed to support the bottom of the basket in a generally horizontal position when the basket is unfolded.

The invention can also be used on motorized scooters. In this embodiment, shown in FIGS. 13-16, the carrier 301 comprises a basket support 303 and a foldable basket 305. The basket support 303 has u-shaped frame formed by a pair of spaced-apart vertical side posts 307, 309 joined by a bottom cross bar 311. The support 303 has vehicle connecting means 313 for connecting it to the vehicle. The vehicle connecting means comprises a forwardly extending mounting bar 315 extending forwardly from the center of the bottom cross bar 311 of the frame. The mounting bar 315 is telescopic. A split, hinged, clamp 317 is mounted at the front of the mounting bar 315. The clamp 317 is detachably connected to the seat post 319 of the vehicle. The support 303 also has basket connecting means 321 for use in connecting the basket 305 to the support. The basket connecting means 321 can comprise the a pair of hanger hooks or clips 323 mounted on the rear of each of the side posts 307, 309 of the support 303, the clips 323 on each post spaced apart vertically.

The carrier 301 in this embodiment can have additional support means for the basket that are connected directly to the vehicle instead of to the support. For example, a tubular sleeve 327 can be mounted over the bottom cross-member 329 joining the bottom ends of the arms 331, 333 of the stabilizing frame 335 of the basket. A pair of gas cylinders 337, 339 can be mounted from one end in spaced apart manner on the sleeve 327. The other ends of the cylinders can be mounted on the frame member 341 of the vehicle supporting the safety wheels 343 at the back of the vehicle.

The basket 305 shown for use in the motorized vehicle has the same general construction as the basket used in the wheelchair but is shown without wheels and without a handle, the basket meant to be used on the vehicle only and not alone. Such a basket could also be employed on a wheelchair if desired. The basket 305 could be used on the motorized chair, mounted directly on the chair, if the chair has a detachable headrest. As shown in FIG. 17 the basket 347 could be provided with a pair of brackets 349 attached to the top of the rear frame 351 of the basket. The brackets 349 extend upwardly and over the top 353 of the seat back 355 and are spaced apart the same distance as the posts 357 holding the head rest 359 on the top 353 of the seat. The brackets 349 have holes for receiving the head rest posts 357 as the head rest 359 is mounted on the seat back. The head rest posts 357 retain the basket 347 against the seat back 355 and help carry its loaded weight. The basket 347 could be mounted by the brackets 349 alone without any further support for the chair.

The posts 307, 309 on the support 303 could be provided with the upper and lower basket connecting means 123, 125 used on the posts 123, 125 of the support 3. With this addition, the support 303 could be used to support either the basket 305, which is without wheels and a handle, or the basket 5 which has wheels and a handle. In this embodiment, the support is not normally detached from the motorized chair. In this embodiment, the additional support means in the form of the gas cylinders 337, 339 is not required.

I claim:

1. A carrier for a motorized invalid vehicle having a seat post supporting a seat, the carrier comprising: a basket support and a foldable basket; the foldable basket having a front wall and a back wall both pivotally connected to a bottom wall, and side walls each pivotally connected between the front and back walls; the basket support having vehicle connecting means for detachably connecting the support to the vehicle with the support located behind the seat, the vehicle connecting means comprising an arm extending from the basket support under the seat to the seat post to securely fasten the basket support to the seat post; the basket support having basket connecting means for detachably connecting the basket to the back of the support with the back wall of the basket against the support.

2. A carrier as claimed in claim 1 wherein the support is a U-shaped member having two spaced apart vertical legs joined by a bottom horizontal leg, the arm extending from the center of the horizontal leg.

3. A carrier as claimed in claim 2 wherein the basket connecting means on the support comprise vertically spaced apart connecting members on each leg of the support for holding the back wall of the basket against the back of the support.

4. A carrier as claimed in claim 3 including support means for the basket extending down from the front, bottom region of the basket, to the bottom rear of the vehicle.

* * * * *